US011260893B2

(12) United States Patent
Carreras et al.

(10) Patent No.: US 11,260,893 B2
(45) Date of Patent: Mar. 1, 2022

(54) PORTABLE DEVICE FOR ROCKING A STROLLER IN ORDER TO PACIFY THE CHILD WITHOUT CONDITIONING IT

(71) Applicant: Baby M, Cannes (FR)

(72) Inventors: Franck Carreras, Cannes (FR); Julie Carreras, Cannes (FR)

(73) Assignee: Baby M, Cannes (FR)

( * ) Notice: Subject to any disclaimer, the term of this patent is extended or adjusted under 35 U.S.C. 154(b) by 0 days.

(21) Appl. No.: 17/294,548

(22) PCT Filed: Nov. 22, 2019

(86) PCT No.: PCT/EP2019/082202
§ 371 (c)(1),
(2) Date: May 17, 2021

(87) PCT Pub. No.: WO2020/104642
PCT Pub. Date: May 28, 2020

(65) Prior Publication Data
US 2021/0362766 A1    Nov. 25, 2021

(30) Foreign Application Priority Data

Nov. 22, 2018  (FR) ...................................... 1871704

(51) Int. Cl.
*B62B 9/22*  (2006.01)
(52) U.S. Cl.
CPC .......... *B62B 9/22* (2013.01); *B62B 2301/256* (2013.01)

(58) Field of Classification Search
CPC ................ B62B 9/22; B62B 2301/256; B62B 2301/258; B62B 2301/254; B62B 2301/252; B62B 2301/25
See application file for complete search history.

(56) References Cited

U.S. PATENT DOCUMENTS

| 2,552,223 A | 5/1951 | Seifts | |
| 5,099,528 A * | 3/1992 | Wadman | B62B 9/22 180/166 |
| 7,971,885 B2 * | 7/2011 | Sanders | B62B 9/22 280/47.1 |
| 10,173,711 B1 * | 1/2019 | Correa | B62B 9/22 |

(Continued)

FOREIGN PATENT DOCUMENTS

| DE | 19727173 A1 | 1/1999 |
| DE | 202005017014 U1 | 1/2006 |
| DE | 102005004501 A1 | 8/2006 |

(Continued)

*Primary Examiner* — John D Walters
(74) *Attorney, Agent, or Firm* — James C. Lydon (57) ABSTRACT

Rocking device for a stroller (2), including at least one main element (10) provided with a motor (40) and rolling means (21, 23) on its lower face, the motor and the rolling means being designed to drive the main element in a back and forth movement, the upper face of the main element (10) being designed to take a wheel (3) or (4) of the stroller. The rolling means are designed to roll on the ground and the device comprises a means for automatically starting the back and forth movement as a result of a deliberate action on the part of the user in pushing the stroller (2) so as to drive the main element (10) at least once in a first direction and at least once in the direction opposite to the first direction.

25 Claims, 5 Drawing Sheets

(56) References Cited

U.S. PATENT DOCUMENTS

2009/0064410 A1\* 3/2009 Cohen ...................... A47D 9/02
5/109

FOREIGN PATENT DOCUMENTS

| EP | 0415736 | A1 | 3/1991 |
|----|---------|----|--------|
| EP | 2418140 | A1 | 2/2012 |
| FR | 2651980 | A1 | 3/1991 |
| GB | 2432307 | A  | 5/2007 |
| KR | 20160017590 | A | 2/2016 |
| SE | 1400114 | A1 | 10/2015 |
| WO | 2014013482 | A1 | 1/2014 |

\* cited by examiner

PORTABLE DEVICE FOR ROCKING A STROLLER IN ORDER TO PACIFY THE CHILD WITHOUT CONDITIONING IT

TECHNICAL FIELD

The present invention relates to devices intended to swing and rock strollers to lull infant children to sleep and relates in particular to a portable and intelligent stroller rocking device to pacify the child without conditioning it.

TECHNICAL BACKGROUND

There are a number of devices for automatically swinging and rocking child strollers. These devices consist in inducing a back and forth movement of the stroller so as to lull the child to sleep. These devices step in for the parents during the soothing and lulling their child to sleep. Indeed, for the parents' convenience, a stroller is often used as a child's second crib as infants need a great deal of sleep during the first months of life. On the other hand, when the child is a few months old, he or she associates the stroller with the movement and sometimes the child shows impatience when the stroller is immobilized. The movement given by the parent can allow the child to regain the impression of movement. When the parents and the child are away from home, the child may find themselves in an environment that is not conducive to soothing or falling asleep and the simple act of moving the stroller can have a soothing effect. In some cases, such as in a restaurant, at a friend's house or even in a public place, the back and forth movement of the stroller given by the parent to rock the child and help him/her fall asleep can be tedious. In particular in these cases, the use of a device to automatically rock the stroller can be very useful. However, these devices have drawbacks.

A first type of rocking device described for example in documents FR2651980 and WO2014/013482 comprises a roller or a friction wheel intended to drive one of the wheels of the stroller. The disadvantage of this type of device is that it must be attached to the stroller to be functional and therefore adapted to each type of stroller.

A second type of swinging device is in the form of a platform on which one or more wheels of the stroller are placed. Documents EP2418140 and EP0415736 describe such devices. But due to their large size, they are not intended for mobile use, especially outside the home.

Another drawback of these systems lies in the risk of conditioning the child's sleepiness to a particular continuous back and forth movement produced by these devices. Indeed, these devices operate for a certain time before stopping according to preset or user-defined cycles and according to a given frequency, but do not take into account other parameters specific to the child and related to the environment, which can avoid conditioning.

In addition, starting and stopping these devices is not practical when it comes to actuating a switch located on the device under the stroller. This lack of ease of use may become somewhat burdensome to the parents who then tend to let the device operate longer than necessary.

SUMMARY OF THE INVENTION

This is why the object of the invention is to provide a reliable and compact stroller rocking device which accompanies the child in the stage which precedes falling asleep, which overcomes the aforementioned drawbacks and the starting and stopping of which are made easier.

The object of the invention is thus a rocking device for a stroller comprising at least one main element provided with a motor and rolling means on its lower face, the motor and the rolling means being designed to drive the main element in a back and forth movement, the upper face of the main element being designed to receive a wheel of the stroller. According to the main features of the invention, the rolling means are designed to roll on the ground and the device comprises a means for automatically starting the back and forth movement as a result of a deliberate action on the part of the user, consisting in pushing the stroller so as to drive the main element at least once in a first direction and at least once in the direction opposite to the first direction.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE INVENTION

Figure 1:
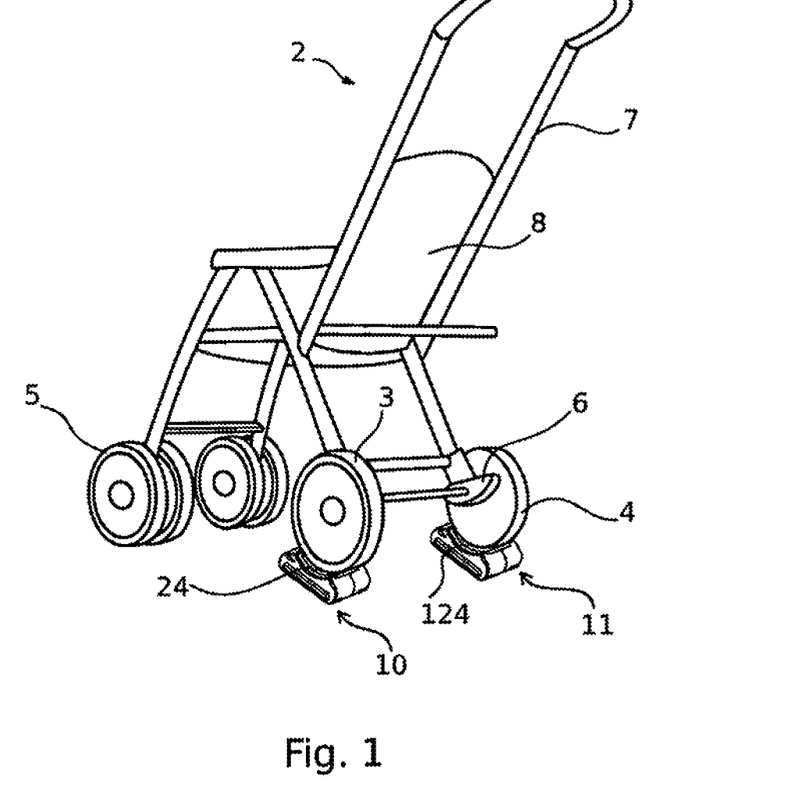
FIG. 1 shows an overall diagram of the device according to the invention and a stroller.

According to FIG. 1, the rocking device according to the invention comprises two mobile elements, including at least one main element 10 equipped with a motor and a secondary element 11. In the embodiment described, the secondary element is not motorized but has an external shape identical to that of the main element 10. Each of the two elements are intended to support a wheel 3 or 4 of a stroller 2. The stroller mainly comprises wheels 3, 4 and 5, a frame 7 and a hammock 8 on which the child is placed. The hammock can be a baby carriage, a car seat or the like. Each element 10 and 11 has rolling means intended to be placed on the ground and has an upper face designed to support any type of wheel. The wheels 3 and 4 placed on the elements 10 and 11 are those on which a brake 6 can be actuated to prevent their rotation and for safety reasons.

Figure 2:
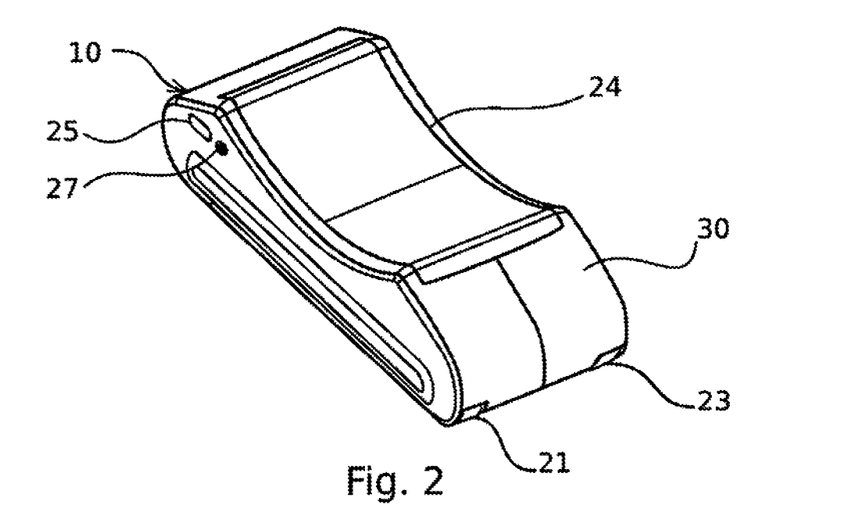
FIG. 2 shows the device according to the invention in three dimensions.

Referring to FIG. 2, the main element 10 is enclosed in a protective shell 30. The element 10 comprises, on its lower face, at least two rolling means 21 and 23 intended to be placed on the ground and on its upper face the wheel support 24 of suitable shape to receive and support a wheel of the stroller 2. The rolling means of the secondary element are identical to those of the main element.

According to a preferred embodiment, the wheel support 24 includes means for blocking the wheel without constraining it. These means prevent the wheel from unintentionally exiting the wheel support and are defined by a "cup" shape with two side walls inclined towards the center, or more precisely curved with a partially circular shape. These means can also be supplemented by a slip-resistant coating. The secondary element 11 also includes means for preventing the wheel from exiting its location, identical to those of the element 10, such as a wheel support 124 of the same shape as the wheel support 24 and provided with a slip-resistant coating.

The main element 10 includes a USB 25 or other type interface for connection to a wired data exchange means or to a means for recharging its battery located under the shell. The main element 11 also includes a light means 27 such as a light emitting diode (LED) to indicate the operating state of the device.

Figure 3:
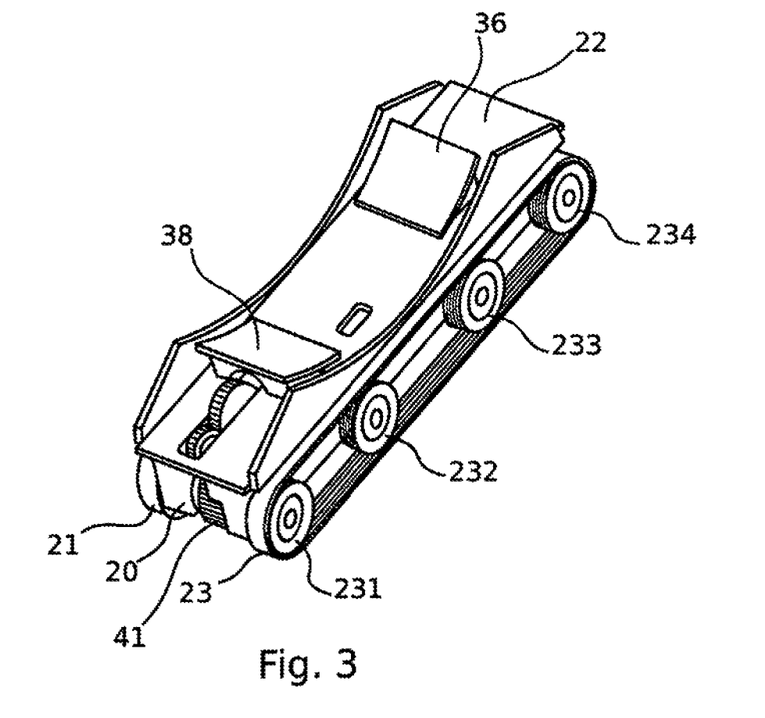
FIG. 3 shows the interior of the device according to the invention.
Figure 4:
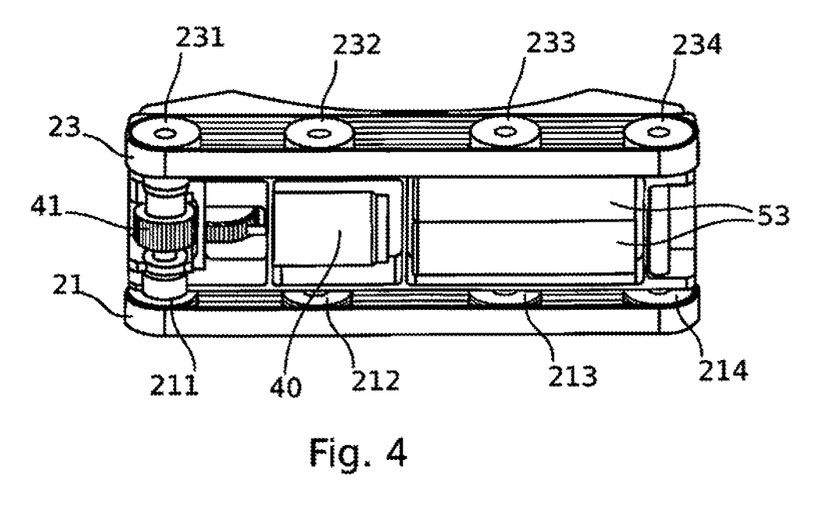
FIG. 4 shows a bottom view of the interior of the device according to the invention.

The main element 10 is shown without its shell in FIGS. 3 and 4. It is made up of a frame 20 on which is secured a printed circuit 22 containing the electronic circuit intended to manage the powering, the starting and the stopping of the motor and the operating cycle of the device according to the invention. The main element 10 includes a means for detecting the presence and movements of a weight, such as for example the stroller located on the wheel support. This means can be a pressure sensor. The pressure sensor used is a strain sensor or an accelerometer. According to a preferred embodiment, the device according to the invention comprises two pressure sensors. The first pressure sensor comprises a first connecting piece 36 and the second pressure sensor comprises a second connecting piece 38. The connecting pieces are identical and placed in opposition on the printed circuit 22. Each connecting piece comprises an inclined face intended to match the inclined sidewalls of the wheel support of the main element.

According to the preferred embodiment of the invention, the rolling means of the main element 10 are two tracks 21 and 23 as can be seen in FIGS. 3 and 4, located on each side of the device. Each track is of the closed belt type tensioned by two pulleys located at the ends of the element and guided by one or two intermediate rollers located between the pulleys. Thus, the track 21 is tensioned by the pulleys 211 and 214 and guided by the rollers 212 and 213. Likewise, the track 23 is tensioned by the pulleys 231 and 234 and guided by the rollers 232 and 233. For each track, at least one of the pulleys is driven by a motor 40. According to the preferred embodiment, the drive pulleys are pulleys 211 and 231, fixed on a common shaft driven by the motor through a transmission by a set of gears 41 comprising a number of pinions and worm screws.

Only the main element 10 has a motor 40 for moving the drive pulleys 211 and 231, which in turn drive the rolling means 21 and 23 in a straight path and back and forth movement. The distance traveled by the main element in each of the two directions is fixed and limited. The secondary element 11 also comprises rolling means such as two closed belt type tracks tensioned by two end pulleys and guided by one or two intermediate rollers.

The tracks are preferably made of rubber or of a material having similar mechanical properties. The inner surface of the tracks, that is to say the surface in contact with the pulleys and the rollers, has a shape designed to cooperate with the shape of the pulleys and the rollers. For example, the tracks are provided with ridges on their inner face in their longitudinal direction as can be seen in FIGS. 3 and 4. The pulleys and rollers are preferably provided with ridges of a shape complementary to that of the ridges of the tracks. Thus, the tracks are adapted to mesh with the pulleys and rollers. The longitudinal ridges improve the adherence between the rolling means and the drive pulleys by preventing slippage and track breaking off.

Other drive means can be used for the track without departing from the scope of the invention. For example, the tracks can be notched. In this case, the pulleys and rollers are provided with teeth the shape of which is complementary to that of the notches of the track so that the tracks are designed to mesh with the pulleys and rollers.

The motor 40 is powered by at least one battery and preferably two lithium-type batteries 53.

Figure 5:
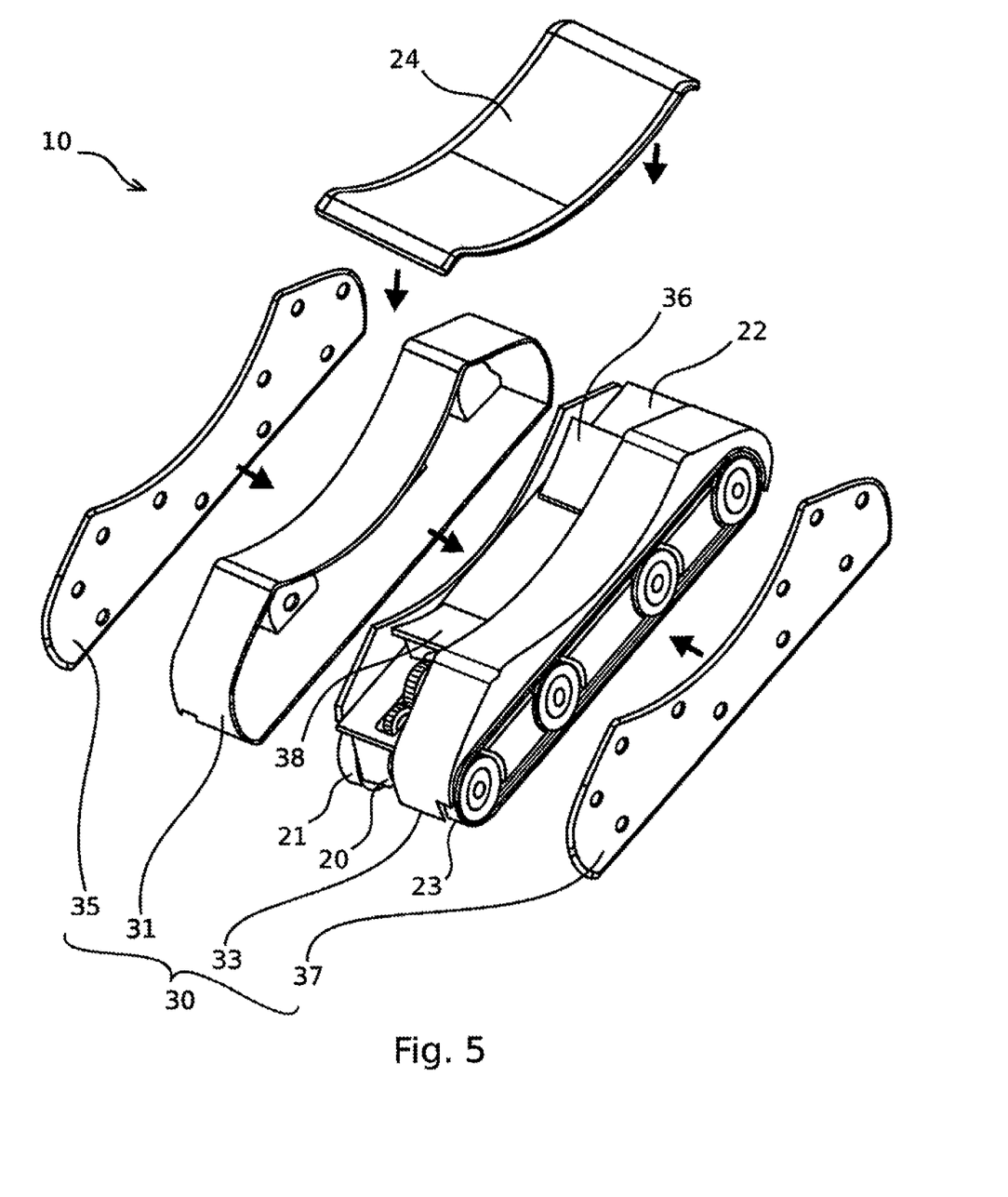
FIG. 5 shows an exploded view of the device according to the invention.

The main element and its shell in exploded view are shown in FIG. 5. The shell of the device may consist of several parts. Advantageously, the shell 30 comprises two symmetrical half-shells 31 and 33. Each of the half-shells is intended to surround so as to include half of the frame 20 in the longitudinal direction and two halves of the two connecting pieces 36 and 38 as can be seen in FIG. 5 where the half-shell 33 is placed around the frame. Preferably, when the two half-shells are placed around the frame, they are edge-to-edge in the center of the element.

The upper part of the shell 30 has a "cup" shape, or more precisely is curved with a partially circular shape which is complementary to the wheel support 24 and to the connecting pieces. The connecting pieces 36 and 38 are placed on the printed circuit so that their inclined faces match the upper surface of the shell 30.

The four pulleys and the intermediate rollers as well as the rolling means composed of the two tracks 21 and 23 are placed on the frame after the half-shells. This prevents dust and dirt accumulated by the rolling means in contact with the ground from polluting the interior of the main element and in particular the mechanical and electronic components.

The shell 30 also comprises two covers 35 and 37 intended to be pressed against the outer edges of the two half-shells. When the covers are in place on the half-shells, only the parts of the tracks 21 and 23 in contact with the ground are visible.

The stroller support 24 of element 10 is placed on the half-shells last and helps protect the device and hold the shells together.

Figure 6:
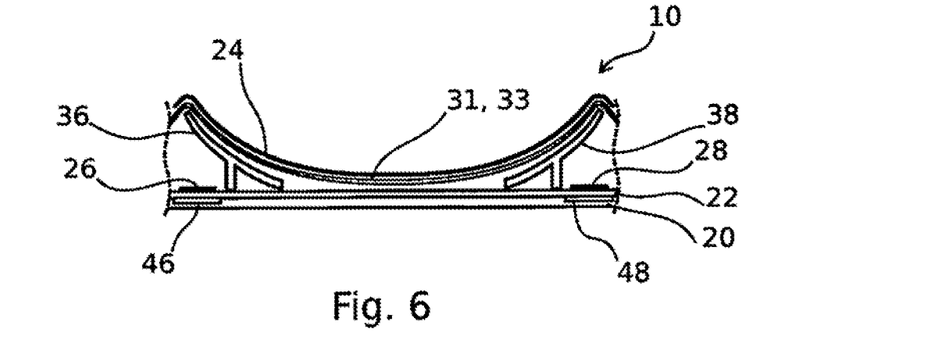
FIG. 6 is a schematic and partial view of the device according to the invention in a longitudinal section.

FIG. 6 is a schematic and partial view of the device according to the invention in a longitudinal section, The printed circuit includes at least one pressure sensor. According to a preferred embodiment of the invention, the pressure sensors each comprise at least one strain gauge 26 and 28 located on the printed circuit 22. The strain gauges measure a deformation of the support to which they are glued, in this case, in the invention, they measure the deformation of the printed circuit 22. The printed circuit is pressed against the frame 20 which has two small cavities 46 and 48. The cavities are located on the chassis so that the printed circuit portion including the strain gauges is on the cavities. Cavities have the advantage of increasing the sensitivity of the strain measurement.

The mechanical connecting pieces 36 and 38 are located so as to be positioned between the printed circuit and the shells 31 and 33 and are in permanent contact with the printed circuit.

When a force is applied to the wheel support 24, it is transmitted by the connecting pieces to the printed circuit via the strain gauges. The connecting pieces are located at two separate locations on the printed circuit so that each connecting piece mechanically connects one of the two inclined side walls of the wheel support 24 at a location on the printed circuit near each strain gauge, respectively. The deformation of the printed circuit induced by the force exerted on the support and transmitted by the connecting parts is measured by the strain gauges.

In a preferred embodiment, each pressure sensor comprises two pairs of strain gauges placed on each face of the printed circuit, facing each other, and mounted as a half-bridge. Each pair is located near a connecting piece, respectively. This arrangement makes it possible to avoid the deformation of the printed circuit caused by the thermal expansion. Indeed, if a temperature-induced deformation occurs, it is measured by the two strain gauges on either side of the printed circuit and, thanks to their half-bridge mounting arrangement, the effects of the temperature-induced deformation are canceled out.

Figure 7:
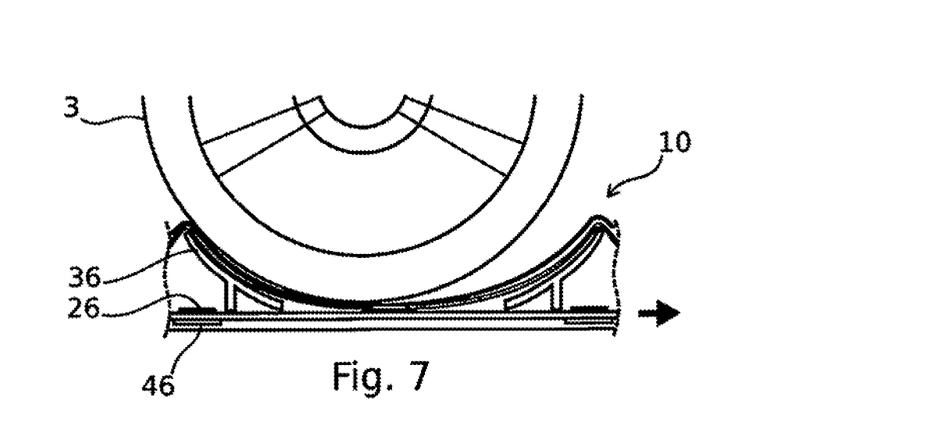
FIG. 7 is a schematic view of a section of the element 10 bearing a wheel, moving from left to right.
Figure 8:
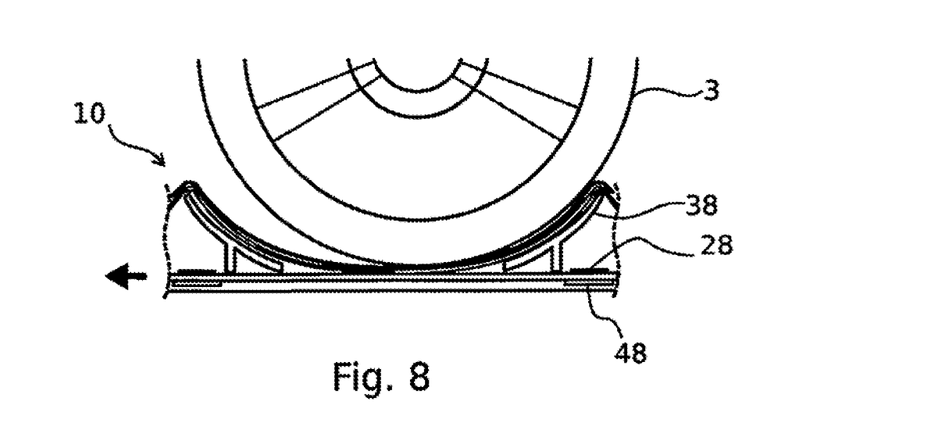
FIG. 8 is a schematic view of a section of the element 10 bearing a wheel, moving from right to left.

FIG. 7 schematically shows the element 10 moving from left to right and on which a stroller wheel 3 is placed. In FIG. 8, the element 10 moves from right to left. The movement is a uniform rectilinear movement or an accelerated rectilinear movement as in the starting phase. Even though the stroller brake blocks the wheel, preventing it from rotating on its axis, the left to right movement of the element 10 causes the weight of the stroller to shift in the opposite direction.

When the movement is from left to right, the value of the force applied by the wheel reaches a maximum on the left and a minimum on the right, while in a movement from right to left, the value of the force applied by the wheel reaches a minimum on the left and a maximum on the right. The pressure sensor made up of the connecting piece 36 and the strain gauge 26 is subjected to greater pressure than the pressure sensor made up of the connecting piece 38 and the strain gauge 28 in a movement from left to right and vice versa.

Thus, when the element 10 moves in one direction, the load on the pressure sensor located opposite the direction of movement reaches a maximum while the load on the pressure sensor located closest to the direction of movement reaches its minimum.

Figure 9:
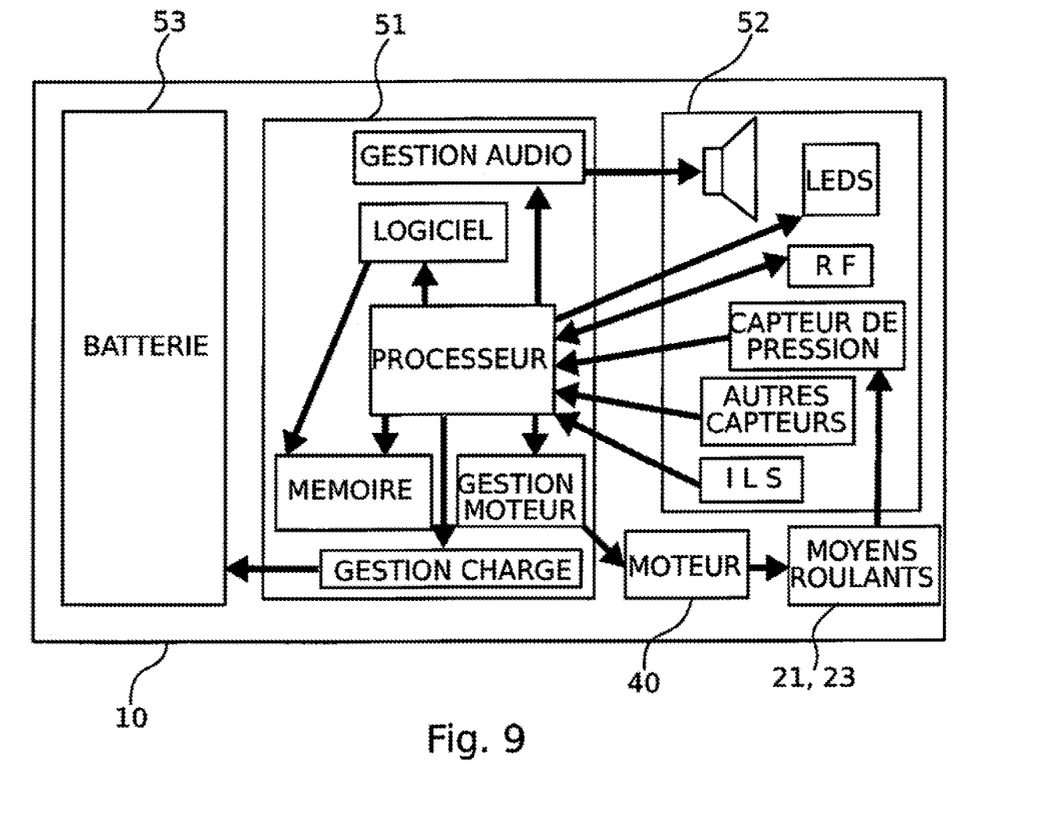
FIG. 9 is a block diagram of the electrical circuit of the device according to the invention.

With reference to FIG. 9, the main element 10 also comprises a control and piloting module 51, a peripheral module 52 and a charging module such as a battery 53. The control and piloting module comprises the printed circuit provided with a processor, a control program 55, a memory, means for managing the peripherals and a means for measuring the electrical consumption in real time in order to manage the efficiency. The peripheral module 52 comprises a radio frequency (RF) signal transceiver circuit thus capable of exchanging data remotely with a contactless peripheral and at least one pressure sensor capable of providing the processor with information relating to the translational movement of the stroller and the restlessness of the child. The peripheral module comprises other peripherals and sensors such as means for measuring ambient noise level, temperature and humidity, an audio device, LEDs, and means for putting the main element on standby such as a reed switch. The pressure sensor allows the device to detect the time when the child is in the stroller and when it is removed from the stroller.

The reed switch changes state when the two elements 10 and 11 are in contact, for example by means of magnetized parts which cooperate together. The standby state may mean that the device is inactive but may allow the RF signal transceiver to operate in the absence of the child so as not to expose him/her to RF waves. A second battery, which acts as a backup battery, can be contained in the secondary element. The second battery charges the first battery 53 when the two elements are in magnetic contact. The main element has a charge indicator to show the charging status of the battery to the user. This indicator can be the light means 27 such as a colored LED. A LED can also indicate the status of the device, such as "operating", "on standby" and "exchanging data with the digital terminal" depending on the color.

Figure 10:
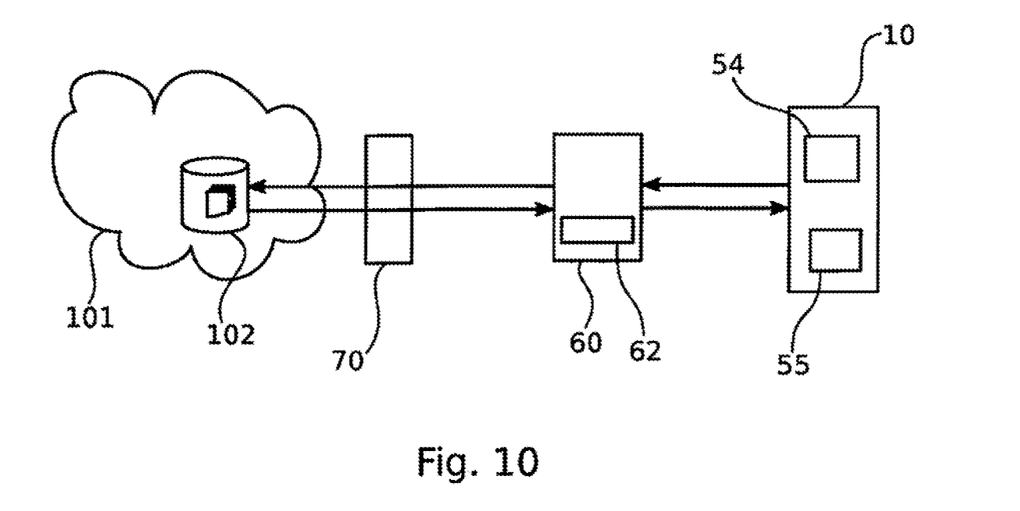
FIG. 10 is the general operating diagram of the device according to the invention as a connected object.

The contactless RF signal transceiver circuit of the main element 10 is preferably based on Bluetooth type communication. With reference to FIG. 10, the Bluetooth module 54 of the main element 10 is capable of exchanging data with a digital terminal 60. This exchange of information can take place in both directions. The digital terminal 60 can be a smartphone, a tablet, or a computer and comprises a touch screen. The digital terminal is wirelessly connectable to a database 102 accessible on the Internet network 101 via a telecommunication and geolocation network or the like. An interface or an application 62 installed on the digital terminal allows the user to control the state of the device and the data recorded during its use. The data of each device can be stored in the database 102 accessible by a means of identification 70 of the user. All of the user's data, programs, settings, etc. are available on the interface 62. The usage data can be viewed for example in the form of a graph showing usage as a function of time.

The main element is provided with an audio device so as to broadcast sounds, via a loudspeaker, such as lullabies or sounds of nature. These sounds, previously recorded in the memory of the control and piloting device, can be chosen and recorded by the user himself/herself via the interface 62 of the digital terminal 60.

The control program 55 stored in the memory of the main element can only be executed when the device is not on standby so as to prevent the motor from starting when the device is on standby. The control program is therefore run in the absence of communication with the digital terminal. Mainly, the control program controls the starting and stopping of the motor, the duration of the operating ranges and their frequency according to a default preset sequence recorded in the memory of the main element. The default sequence consists in starting the motor, running it for a period between 2 minutes and 4 minutes, such as 3 minutes for example, stopping the motor and switching the device to "Listening", that is to say ready to restart if the child cries or the stroller moves. The default control program can be updated via the digital terminal 60, but it can also evolve autonomously as and when used, in the manner of an expert system.

The control program can adapt itself thanks to information provided by the main element and recorded during its use. The information can be that measured by sensors and measuring means of environmental parameters such as noise, restlessness of the child, temperature, humidity, etc. Adapting the control program means defining or modifying certain variables of its operation from the parameters recorded by the sensors as the device is used, and defining an adapted sequence.

Through the interface 62 of his/her digital terminal, the user can choose whether the control program will execute the default sequence or the adapted sequence when the device is started. Of course, through the interface 62 of the digital terminal 60, the user himself/herself can vary certain parameters of the control program such as the duration of the operating ranges and their frequency within the limit of the maximum range defined in advance for the safety of the child and to avoid conditioning of the latter.

The database 102, accessible on the Internet, is fed by the owners and users of the device according to the invention who use the application on their digital terminal. The data collected is used anonymously. It makes it possible to establish statistics and is used to develop a collaborative platform.

The database can also be used to develop a new version of the control program and make it available online to users. Indeed, from the data collected, correlations can be established between environmental variables and the need to rock a child. Therefore, the user's control program can also be adapted from data available on the collaborative platform. This ability to connect to an information network gives the device according to the invention the status of a connected object.

The following description describes the operation of the device according to the invention.

When parents need to rock their child placed in the stroller, they place the two elements 10 and 11 on the ground so that the rolling means rest on the ground. The wheels on which the parking brake of the stroller has been applied are preferably placed on the wheel support of the two elements.

The starting of the motor is automatically triggered by the user when it is set in motion by manual actuation of the stroller placed on the device according to the invention. Manual actuation consists of the user pushing and pulling the stroller back and forth as if to produce a swinging motion of the stroller to manually rock his/her child.

Thus, by pushing and pulling the stroller, the user drives the movable elements in a back and forth movement and the stroller moves with them. The deformation sensors are alternately loaded by going through a maximum and then to a minimum, as described with reference to FIGS. 7 and 8, and thus the control and piloting module recognizes a back and forth movement. The number of round trips from which the control and piloting module starts the motor and runs the control program is at least equal to one and can be set to be equal to two or three. By default, the motor is started when each pressure sensor is activated alternately, i.e. after one round trip. The back and forth movement of the main element 10 drives the movement of the stroller which in turn drives the secondary element 11. The motor follows a sinusoidal type speed curve with a plateau when the motor reaches its maximum speed. The motor drive is preferably configured in such a way that, at the end of the translational movement in one direction, i.e. before the direction of the movement is reversed, the speed has gradually decreased.

The movement is stopped automatically after a fairly short predefined period of between 2 and 4 minutes. The stop is progressive, that is to say that the speed of the back and forth movement gradually decreases before the movement stops. The device then detects any movement of the stroller or crying which would mean that the child is still restless and the rocking would then be resumed automatically. At any time, the device can be restarted and the movement resumed with a deliberate gesture by the user. The device can thus be started several times consecutively for short periods of time until the child has calmed down.

The device can also be stopped deliberately by the user. For this, the user holds the stroller, the alternating cycle of the weight on the two pressure sensors is broken, and the control and piloting module sends a stop signal to the motor. The device is also stopped when the user removes the stroller from the device, or when the child is removed from the stroller which rests on the device. In these two cases, the two pressure sensors detect a significant variation in the weight and the control and piloting module sends a stop signal to the motor. A sound or light signal is emitted when the child is removed from the stroller.

Each time the device is used, data such as the number of consecutive times the device has started, time, ambient noise level, humidity, temperature, is recorded. The data is stored in the memory of the motorized element before it is sent to the digital terminal 60.

No communication between the digital terminal 60 and the motorized element 10 is possible and authorized when the device is placed under the wheels of the stroller and operating. Indeed, as soon as the two elements are separated from each other, the Bluetooth module 54 is switched off, whereas, when the two elements are associated with each other by magnetic contact, communication is again possible. This interruption in wireless communication activated by the reed switch allows the device not to emit radio waves when it is used, therefore when it is near the child.

The control and piloting module acts on a number of parameters of the movement of the device according to the invention. These parameters are mainly stroke length, frequency, acceleration and deceleration, and the duration of the operating cycle.

The stroke length is preferably between 40 and 90 mm and more preferably equal to 50 mm. The period of movement of the main element 10 can have a frequency range between 10 and 40 cycles per minute.

The control and piloting module is configured to adjust certain parameters of the device during its operation. These adjustable parameters are the frequency, acceleration and deceleration of the movement. The adjustment is made in relation to data measured during operation, which is supplied by the pressure sensors and by the means for measuring and optimizing the electrical consumption.

In addition, as soon as data is stored, the control program can adapt itself according to the content of the data. For example, if the device is set into motion more than 4 consecutive times, (the child has not calmed down despite the consecutive rocking periods), the control program adapts itself so that the duration of the first rocking cycle will be increased at the next use. The control program can be adapted using other data such as time of day, ambient temperature, etc. In addition, even if the control program is adapted, it is always adjusted to avoid conditioning the child. For example, two consecutive operating sequences, each corresponding to the child's falling asleep, will not be identical.

The back and forth movement of the device produces a tilting effect of the stroller due to the weight of the child and the stroller shock absorbers. The stroller, and in particular the hammock 8 where the child is placed, follows an oscillating translational movement. Consequently, this tilting effect induces a free oscillating movement of the stroller in addition to the forced oscillations induced by the back and forth movement of the main element 10.

The device comprises a means for analyzing the consumption of the battery in real time during movement and a means for measuring the variation of the current drawn by the motor. This means can be a coulomb counter. During the movement of the main element 10, the control and piloting module adjusts the parameters of the movement such as frequency, acceleration and deceleration so that the variation of the current drawn by the motor during the movement of back and forth translation of the main element 10 tends towards a perfect sinusoid. The power consumption of the device is thus optimized to make the battery last as long as possible.

The device comprises a means to ensure that the distance traveled by the main element 10 is identical on both directions of travel. To ensure that this condition is always met, at least one of the pinions of the gear 41 is equipped with a magnet. A Hall-effect type sensor produces a signal when it detects the magnet, i.e. every time the magnet-carrying pinion rotates. When the magnet passes in front of the sensor a certain number of times, the processor commands the motor to change direction. The number of times the magnet passes in front of the sensor is identical in both directions of rotation and corresponds to the desired travel distance.

Thanks to this means, the mobile element travels an identical distance in both directions of its back and forth movement, even if the motor does not turn at exactly the same speed in both directions. Thus, any possible drift in the movement of the device is canceled. Advantageously, the motorized device is always returned to its starting point before stopping.

According to an alternative embodiment of the invention, the rolling means are two driving wheels at the front and one or two wheels at the rear. In this case the wheels replace the tracks and the two driving wheels also replace the two drive pulleys.

According to a second alternative embodiment of the device according to the invention, the rolling means are a pair of wheels at the front and a pair of wheels at the rear and a central belt which drives the common axis of one of the pairs of wheels.

The invention claimed is:

1. A rocking device for a stroller (2), comprising at least one main element (10) provided with a motor (40) and rolling means (21, 23) on its lower face, said motor and said rolling means being designed to drive said main element in a back and forth movement, the upper face of said main element (10) being designed to receive a wheel (3) or (4) of the stroller,
   wherein said rolling means are adapted to roll on the ground and the device comprises a means for automatically starting the back and forth movement as a result of a deliberate action on the part of the user, consisting in pushing the stroller (2) so as to drive the main element (10) at least once in a first direction and at least once in the direction opposite to the first direction.

2. The device according to claim 1, wherein the upper face of said main element (10) is a wheel support (24) of partially circular shape with two side edges inclined towards the center, so as to define a means for preventing the wheel (3) or (4) from unintentionally exiting the rocking device.

3. The device according to claim 1, wherein said rolling means (21, 23) are two tracks, of closed belt type, the first track (21) is tensioned by two pulleys (211, 214) located at the ends and guided by one or two intermediate rollers (212, 213), the second track (23) is tensioned by two pulleys (231, 234) located at the ends and guided by one or two intermediate rollers (232, 233).

4. The device according to claim 1, comprising a secondary element (11) of external shape identical to the main element (10) and having on its upper face a wheel support (124) of partially circular shape with two side walls inclined towards the center, designed to receive a wheel (3) or (4) of the stroller (2).

5. The device according to claim 4, wherein said main element (10) includes a magnetized part adapted to cooperate with a magnetized part comprised in the secondary element (11) and to hold the two elements (10 and 11) together when they are not used.

6. The device according to claim 1, wherein said main element (10) comprises a control and piloting module (51), a peripheral module (52) and a charging module, said three modules being interconnected.

7. The device according to claim 4, wherein the movable elements (10 and 11) include a shell (30) composed of two half-shells (31 and 33) and two side covers (35 and 37).

8. The device according to claim 1, wherein the main element (10) comprises a frame (20) on which is secured a printed circuit (22) containing an electronic circuit intended to manage switching on, startup and stopping of the motor (40) and an operating cycle of the rocking device.

9. The device according to claim 2, wherein the main element (10) comprises a means for detecting the presence and movements of a weight located on its wheel support (24).

10. The device according to claim 9, wherein the means of the main element (10) for detecting the presence and movements of a weight located on its wheel support (24) comprises two pressure sensors each including at least one strain gauge (26, 28).

11. The device according to claim 10, wherein each pressure sensor comprises a connecting piece (36, 38) located on the printed circuit (22) so as to mechanically connect an inclined side wall of the support (24) to a location on the printed circuit located near a strain gauge (26, 28) respectively.

12. The device according to claim 11, wherein each pressure sensor comprises two pairs of strain gauges placed on each face of the printed circuit (22) facing each other, and mounted in a half-bridge, each pair being located close to the location of a connecting piece (36, 38) respectively, so as to overcome deformation of the printed circuit caused by thermal expansion.

13. The device according to claim 11, wherein the frame (20) comprises cavities (46) and (48), said cavities being located on the frame so that the printed circuit portion (22) comprising the strain gauges lies on the cavities.

14. The device according to claim 6, wherein said secondary element (11) contains a backup battery which charges said charging module when said two elements (10) and (11) are in magnetized contact.

15. The device according to claim 6, wherein said control and piloting module (51) comprises the printed circuit (22) provided with a processor, a control program (55), a memory and means for managing the peripheral module, said control program (55) controlling starting and stopping of the motor, duration of operating ranges and their frequency according to a predefined sequence stored in said memory of said main element (10).

16. The device according to claim 6, wherein said peripheral module (52) comprises means for measuring ambient noise level, temperature and humidity, an audio device, a light means (27), a means for putting said main element (10) in standby and a means for measuring variation in current drawn by the motor (40).

17. The device according to claim 16, wherein said device for putting the main element (10) in standby is a reed switch whose state changes when said two elements (10) and (11) cooperate through contact of said magnetized parts.

18. The device according to claim 16, wherein an audible signal or a light signal is emitted when a child is removed from the stroller.

19. The device according to claim 6, wherein said peripheral module (52) comprises a radiofrequency (RF) signal transceiver circuit (54).

20. The device according to claim 19, wherein said radiofrequency (RF) signal transceiver circuit (54) of the main element (10) is capable of communicating and exchanging data with a digital terminal (60) of a smartphone, the exchange of data being authorized and possible only when said two elements (10) and (11) are in contact and said device is in standby.

21. The device according to claim 20, wherein said mobile digital terminal (60) is a smartphone, an interface or an application (62) installed on the digital terminal allowing the user, after the use of said device, to control data recorded during its use.

22. The device according to claim 21, wherein the data of said device is stored in a database (102) accessible by a means of identification (70) of the user on the Internet network (101), said database (102), accessible on the Internet network (101), being fed by the owners and users of the device according to the invention who use the interface (62) on their digital terminal, said database being used anonymously in order to establish statistics and used for the development of a collaborative platform.

23. The device according to claim 6, wherein a control program (55) is run automatically after the device has started with a deliberate gesture by the user, according to a default sequence or according to a sequence which, after several uses, is adapted to the different pieces of data recorded by said sensors, said sequences being recorded in the memory of said main element.

24. The device according to claim 23, wherein, during movement of the main element (10), the control and piloting module adjusts parameters of the movement so that variation of the current drawn by the motor during back and forth translational movement of the main element (10) tends towards a perfect sinusoid.

25. The device according to claim 1, wherein the main element is provided with a means for ensuring that a distance traveled in one direction is the same as a distance traveled in the opposite direction in a back and forth movement.

* * * * *